(12) United States Patent
Nagasaka et al.

(10) Patent No.: US 9,325,869 B2
(45) Date of Patent: Apr. 26, 2016

(54) IMAGE PROCESSING APPARATUS, IMAGE PROCESSING METHOD, AND IMAGE PROCESSING PROGRAM

(75) Inventors: Tomoya Nagasaka, Tokyo (JP); Kei Yamaji, Tokyo (JP); Nanae Sakuma, Tokyo (JP); Masako Suehiro, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 453 days.

(21) Appl. No.: 13/525,895

(22) Filed: Jun. 18, 2012

(65) Prior Publication Data

US 2012/0321223 A1 Dec. 20, 2012

(30) Foreign Application Priority Data

Jun. 20, 2011 (JP) ................................ 2011-135894

(51) Int. Cl.
H04N 1/00 (2006.01)

(52) U.S. Cl.
CPC ......... H04N 1/00448 (2013.01); H04N 1/0045 (2013.01); H04N 1/00453 (2013.01); H04N 1/00456 (2013.01); H04N 1/00458 (2013.01); H04N 1/00461 (2013.01); H04N 2201/0089 (2013.01)

(58) Field of Classification Search
USPC ........................................................ 382/305
See application file for complete search history.

(56) References Cited

U.S. PATENT DOCUMENTS

| | | | |
|---|---|---|---|
| 7,092,117 B2 * | 8/2006 | Kageyama et al. | 358/1.18 |
| 7,653,217 B2 * | 1/2010 | Ikegawa | 382/112 |
| 7,668,399 B2 | 2/2010 | Sawano | |
| 7,835,580 B2 * | 11/2010 | Ono | 382/224 |
| 8,300,989 B2 * | 10/2012 | Watari et al. | 382/309 |
| 8,421,825 B2 * | 4/2013 | Taniguchi et al. | 345/659 |
| 2001/0035875 A1 * | 11/2001 | Suzuki et al. | 345/723 |
| 2006/0053370 A1 | 3/2006 | Hitaka et al. | |
| 2006/0204129 A1 * | 9/2006 | Sawano | 382/276 |

(Continued)

FOREIGN PATENT DOCUMENTS

| | | |
|---|---|---|
| JP | 2006-074592 | 3/2006 |
| JP | 2006-253992 | 9/2006 |

(Continued)

OTHER PUBLICATIONS

Machine Translation of: JP2006-074592A, JP 2009-093435 A, JP 2006-253992A.*
Japanese Office Action dated Jan. 7, 2014 in corresponding Japanese Patent Application No. 2012-134606 with partial English language translation of Japanese Office Action.

(Continued)

Primary Examiner — Michelle Entezari
(74) Attorney, Agent, or Firm — Young & Thompson

(57) ABSTRACT

An image processing apparatus includes a display for displaying an image layouted in accordance with arrangement information, an editing unit for editing the displayed image, a storage unit for storing a plurality of pieces of arrangement information, an arrangement information selecting unit for selecting the arrangement information used for layouting the image after editing in accordance with the arrangement information of the displayed image and editing information, and an image layouting unit for layouting the image in accordance with the selected arrangement information. With such a configuration, an image having no sense of discomfort after editing can be displayed upon editing such as adding or deleting of an image on a page or double pages displayed in a photo book or the like.

19 Claims, 7 Drawing Sheets

| TEMPLATE BEFORE EDITING | EDITING | IMAGE TYPE | TEMPLATE AFTER EDITING |
|---|---|---|---|
| aaaa | ADDING | HORIZONTAL | aaba |
| | | VERTICAL | aabb |
| | DELETING | HORIZONTAL | aabc |
| | | VERTICAL | aabd |
| aaab | ADDING | HORIZONTAL | aaca |
| | | VERTICAL | aacb |
| | DELETING | HORIZONTAL | aacc |
| | | VERTICAL | aacd |
| aaac | ADDING | HORIZONTAL | aada |
| | | VERTICAL | aadb |
| | DELETING | HORIZONTAL | aadc |
| | | VERTICAL | ----- |
| | | HORIZONTAL | aaea |

(56) References Cited

U.S. PATENT DOCUMENTS

| | | |
|---|---|---|
| 2006/0279555 A1* | 12/2006 | Ono .............................. 345/173 |
| 2009/0094508 A1 | 4/2009 | Kanzaki et al. |
| 2010/0164992 A1 | 7/2010 | Akiya |
| 2011/0012929 A1* | 1/2011 | Grosz et al. ................... 345/661 |
| 2011/0025709 A1 | 2/2011 | Ptucha et al. |
| 2012/0117473 A1* | 5/2012 | Han et al. ...................... 715/723 |
| 2012/0206771 A1* | 8/2012 | Cok ............................. 358/1.18 |

FOREIGN PATENT DOCUMENTS

| | | |
|---|---|---|
| JP | 2007-049518 | 2/2007 |
| JP | 2009-93435 | 4/2009 |

OTHER PUBLICATIONS

Chinese Office Action, dated Sep. 23, 2014, in corresponding Chinese Patent Application No. 201210206600.4.

* cited by examiner

FIG. 4

| TEMPLATE BEFORE EDITING | EDITING | IMAGE TYPE | TEMPLATE AFTER EDITING |
|---|---|---|---|
| aaaa | ADDING | HORIZONTAL | aaba |
|  |  | VERTICAL | aabb |
|  | DELETING | HORIZONTAL | aabc |
|  |  | VERTICAL | aabd |
| aaab | ADDING | HORIZONTAL | aaca |
|  |  | VERTICAL | aacb |
|  | DELETING | HORIZONTAL | aacc |
|  |  | VERTICAL | aacd |
| aaac | ADDING | HORIZONTAL | aada |
|  |  | VERTICAL | aadb |
|  | DELETING | HORIZONTAL | aadc |
|  |  | VERTICAL | — |
|  |  | HORIZONTAL | aaea |

IMAGE PROCESSING APPARATUS, IMAGE PROCESSING METHOD, AND IMAGE PROCESSING PROGRAM

BACKGROUND OF THE INVENTION

The present invention relates to an image processing apparatus, an image processing method, and an image processing program which are used to perform editing such adding or deleting of an image in a photo book and the like.

A photo book (electronic album) is a service which creates a photo album of a layout desired by a user by transmitting a plurality of images (image data) captured by the user through a digital camera and the like to a service provider via the Internet.

Further, software is also available which enables the creation of an arbitrary photo book in a manner such that a user inputs an image captured by a digital camera to the user's personal computer (PC) and operates the PC.

In a case where the photo book is created, for example, the user may select a desired template from a plurality of templates in which the arrangement position of the image and the like (layout) are determined and freely determine the number of pages of the photo book, the images to be disposed on each page, the arrangement of the image on each page, and the like.

Further, in the photo book, an arbitrary page may be selected and displayed on a display, and editing such as adding or deleting of an image on the displayed page may be performed.

As an example, the deleting of an image in the photo book is performed as follows.

As an example, when there is an instruction to edit a page, as shown in FIG. 8A, a page which has one horizontally long image positioned at the upper portion and two small and horizontally long images positioned at the lower portion and arranged in the horizontal direction is edited. It is assumed that one image positioned at the right and lower position is deleted from the page.

Accordingly, as shown in FIG. 8B, templates (that is, the candidates of the template) corresponding to two horizontally long images included in the photo book are displayed on a predetermined area of the display (the left side in the example shown in the drawing).

Next, as shown in FIG. 8C, the user selects a template (the frame in the dashed line), and instructs the application of the template. Accordingly, as shown in FIG. 8D, two images which are not deleted are layouted with the selected template, and the page after editing is displayed.

That is, in the conventional photo book, the user needs to instruct adding and deleting of the image but also instruct selecting or applying of the template when performing editing such as adding or deleting of an image arranged on each page.

On the other hand, there have been various proposals for reducing the process taken by the user in the editing of the image of the photo book.

For example, JP 2006-74592 A discloses a photo book editing device which detects the number of images on the edited page, selects a template (layout data) according to the detected number of images, and rearranges the images on the page of the photo book according to the selected template.

According to the editing device, there is no need for the user to select the template of the image data and it is possible to automatically arrange the images on the page of the photo book using the optimal template.

Further, JP 2007-49518 A discloses a photo book creating device which layouts images using a template including a main layout frame allocating a main image and a sub-layout frame allocating a sub-image as a layout frame. In the photo book creating device, when the number of the sub-layout frames and the number of the sub-images are not equal to each other after the comparison therebetween, the blank sub-layout frame is deleted or a sub-layout frame is added to the template of the other page.

In the photo book creating device, it is possible to create a good-looking photo book by leaving an impression of the main image through this process.

SUMMARY OF THE INVENTION

According to the devices described in JP 2006-74592 A and JP 2007-49518 A, the user may perform adding or deleting of an image without performing selecting or the like of the template with respect to an arbitrary page of the photo book.

However, in the conventional editing of the photo book and the like, basically, the template is selected from the database so as to correspond to only an increase or decrease in the number of the images or the horizontal and vertical type of the image, and the image is disposed.

For example, as shown in FIG. 9, in the conventional photo book, when the image encircled by the dashed line is deleted from the page shown at the left side of the drawing, the appropriate template is selected according to only the vertical or horizontal length of the remaining images and the number of images, and the image is disposed as shown at the right side of the drawing.

For this reason, the impression of the edited page is greatly changed before and after editing, and in many cases, a user who observes the page after editing may feel a strong sense of discomfort.

It is an object of the invention to solve the above-described problems of the prior art, and to provide an image processing apparatus, an image processing method, and an image processing program capable of saving the labor in the selection of a template or the like by a user at the time of performing editing such as adding or deleting of an image on an arbitrary page or double pages of a photo book and remarkably reducing a sense of discomfort of a user after editing.

In order to achieve the above objects, the present invention provides an image processing apparatus which edits an image layouted in accordance with arrangement information, the image processing apparatus comprising: a display for displaying the image layouted in accordance with the arrangement information; an editing unit for editing the image displayed on the display; a storage unit for storing a plurality of pieces of arrangement information; an arrangement information selecting unit for selecting the arrangement information used for layouting an image after editing from the storage unit by using the arrangement information of the image displayed on the display and editing information on editing in the editing unit; and an image layouting unit for layouting an image by using the arrangement information selected by the arrangement information selecting unit in accordance with the editing in the editing unit.

Preferably, the editing unit has one or both of an image adding function and an image deleting function as an image editing function, and the arrangement information selecting unit uses image adding or deleting information as the editing information.

Preferably, the arrangement information selecting unit further uses information on whether an added or deleted image is a vertically long image or a horizontally long image as the editing information.

Preferably, the editing unit has an image rotating function as an image editing function, and the arrangement information selecting unit uses image rotating information as the editing information.

At least part of the plurality of pieces of arrangement information stored in the storage unit preferably correspond to double pages of a book.

Preferably, the arrangement information selecting unit selects the arrangement information used for layouting the image after editing from the storage unit by using a look-up table having parameters such as the arrangement information of the image displayed on the display and the editing information on the editing in the editing unit.

The plurality of pieces of arrangement information stored in the storage unit are preferably classified into a plurality of categories.

Preferably, the arrangement information selecting unit further uses information on a category of the plurality of pieces of arrangement information as information for selecting the arrangement information.

It is also preferable that the arrangement information selecting unit further uses, as information for selecting the arrangement information, information on arrangement information used in screens displayed by the display as sequentially ordered screens.

Preferably, scoring is performed on the image, and the arrangement information selecting unit further uses information on a score of the image as information for selecting the arrangement information, and the image layouting unit performs image layout taking account of the score of the image.

Images of a photo book are preferably edited.

The arrangement information is preferably a template.

The present invention also provides an image processing method for editing an image layouted in accordance with arrangement information, the image processing method comprising: a displaying step for displaying the image layouted in accordance with the arrangement information on a display; an editing information acquiring step for acquiring editing information as information of editing from an instruction for editing the image displayed on the display; a selecting step for selecting arrangement information used for layouting an image after editing from a plurality of pieces of arrangement information stored in advance in a storage unit in accordance with the arrangement information of the image displayed on the display in the displaying step and the editing information acquired in the editing information acquiring step; and a re-displaying step for editing the image in accordance with the editing instruction, layouting the image using the arrangement information selected in the selecting step, and displaying the layouted image on the display.

Preferably, the editing of the image is adding or deleting of the image, and in the selecting step, image adding information or image deleting information is used as the editing information.

Preferably, in the selecting step, information on whether an added or deleted image is a vertically long image or a horizontally long image is further used as the editing information.

Preferably, the editing of the image is rotating of the image, and in the selecting step, image rotating information is used as the editing information.

The arrangement information is preferably a template.

The present invention further provides an image processing program for causing a computer to execute respective steps of the image processing method according to any one of claims 11 to 15 as procedures.

According to the invention with the above-described configuration, at the time of editing such as adding or deleting of an image in a page arbitrarily selected in a photo book, the arrangement information used in the image after editing is selected using the arrangement information used before editing such as information on a template used before editing and editing information such as adding/deleting of an image, and the image is layouted according to the arrangement information.

Thus, according to the invention, there is no need to perform an operation such as selecting of a template by a user, and it is possible to create a page after editing using the arrangement information similar to the arrangement information before editing such as a template before editing. For this reason, according to the invention, it is possible to edit the page or the like of the photo book with a simple operation and remarkably reduce a sense of discomfort of the user before and after editing.

BRIEF DESCRIPTION OF THE DRAWINGS

FIG. 4 is a diagram conceptually illustrating an example of an LUT which is used in the image processing apparatus shown in FIG. 1.

DETAILED DESCRIPTION OF THE INVENTION

Hereinafter, an image processing apparatus, an image processing method, and an image processing program of the invention will be described in detail by referring to the exemplary embodiments shown in the accompanying drawings.

Figure 1:
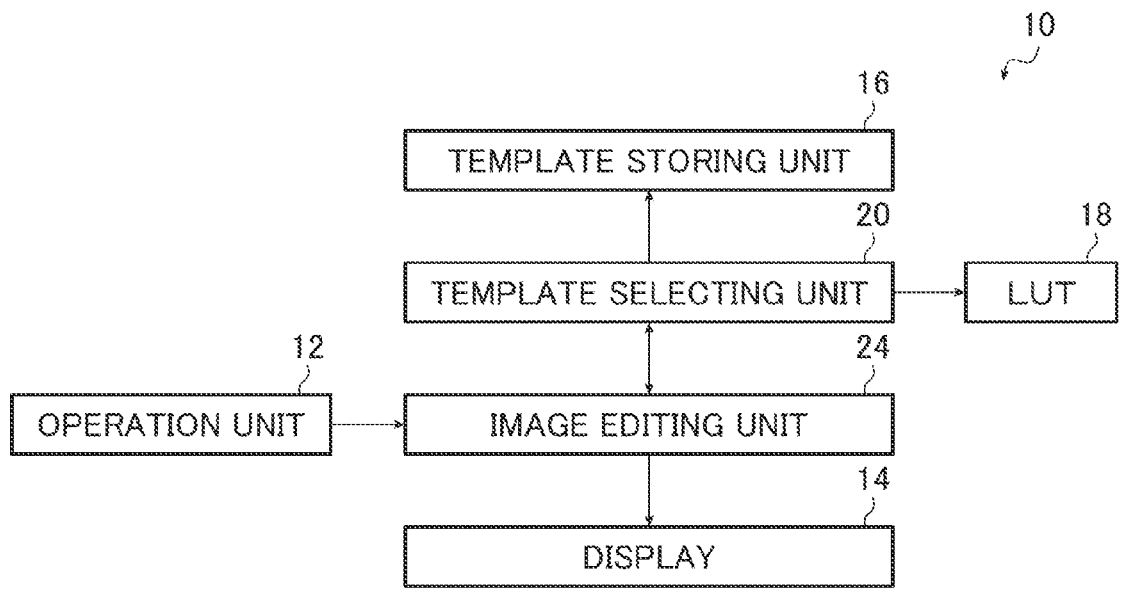
FIG. 1 is a block diagram conceptually illustrating an example of an image processing apparatus of the invention.
Figure 9:
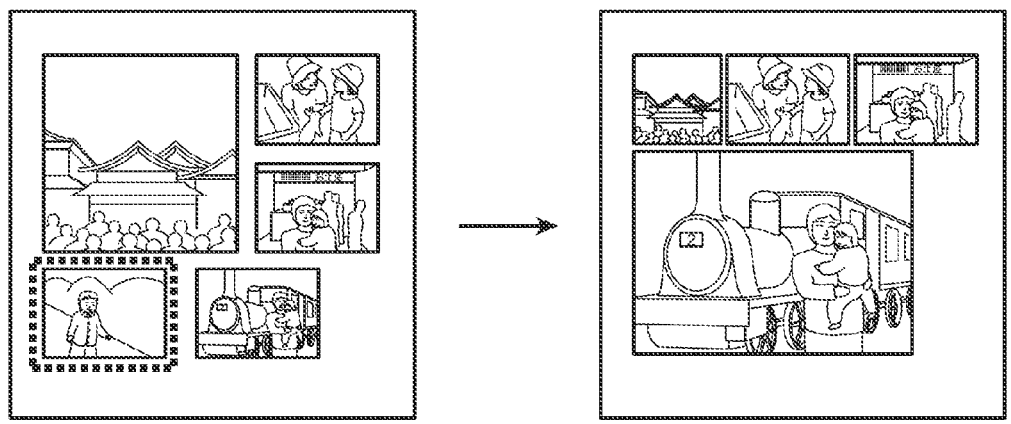
FIG. 9 is a diagram conceptually illustrating the deleting of an image in the conventional photo book.

In FIG. 1, an example of the image processing apparatus of the invention which implements the image processing method of the invention is conceptually shown by a block diagram.

Furthermore, the following example is an example in which the invention is used in a so-called photo book (electronic album), but the invention is not limited thereto. That is, the invention may be used in various apparatuses which arrange and display images through a digital photo frame and the like using arrangement information representing the arrangement position of an image such as a template.

An image processing apparatus 10 is an apparatus which performs editing such as adding, deleting, and rotating of an image on an arbitrary page (double pages) of a photo book.

In the example shown in the drawing, the image processing apparatus 10 basically includes an operation unit 12, a display 14, a template storing unit 16, a look-up table (LUT) 18, a template selecting unit 20, and an image editing unit 24.

Further, although it is not shown in the drawings, the image processing apparatus 10 includes an image acquiring unit which acquires an image via various storage media, a wired/wireless network, or the like and an image storing unit which stores the image acquired by the image acquiring unit.

Furthermore, the image processing apparatus 10 of the invention is not limited to the configuration shown in the drawings.

For example, in addition to the respective parts shown in the drawings, the image processing apparatus 10 of the invention may include various parts constituting a known photo book for the purpose of performing creation of a photo book or editing such as adding, deleting, or rotating of an image to be described later in response to the operation (input command) through the operation unit 12. As an example, the image processing apparatus 10 of the invention may include a page number acquiring unit which acquires information on the number of pages of the photo book, a manual template selecting unit which selects a template for each page of the photo book, an image selecting unit which selects an image displayed on each page of the photo book, and the like, in addition to the respective parts shown in the drawings.

The image processing apparatus 10 is configured by using a computer and a program (software/application) as an example. That is, the program is an image processing program of the invention which allows a computer to execute the image processing method of the invention.

The operation unit 12 is configured to perform various operations such as editing of a photo book by a known means used in a computer such as a GUI (Graphical User Interface) employing an operation means such as a mouse, a keyboard, a touch panel, and a track ball and an image display through the display 14.

The display 14 is configured to perform a display of the photo book or a display for the operation using the GUI, and is a known display such as a liquid crystal display or a plasma display.

The template storing unit 16 is a storage unit which stores a template usable in the photo book of the image processing apparatus 10. The template storing unit 16 is configured by using, for example, a hard disk or the like.

In the invention, the template is a known template (layout data) used in a photo book, a photo frame, or the like in which a layout frame (hereinafter, also simply referred to as a "frame") where an image (picture) may be disposed is formed.

The template storing unit 16 stores a great number of templates of various designs in which the number of frames for vertically long images, the number of frames for horizontally long images, the position of a frame, the size of a frame, and the like are different from each other so as to correspond to the number of various images which are assembled in the template.

Furthermore, in the example shown in the drawings, the template is used as the arrangement information corresponding to information representing the position of an image in double pages (to be described later) or one page of the photo book, the photo frame, and the like, but the invention is not limited thereto. That is, in the invention, as the arrangement information, various information items representing the arrangement position of the image in double pages and the like of the photo book may be used. As the arrangement information other than the template, an example thereof includes coordinate information on double pages or one page, coordinate information and size information of an image on double pages or one page, position information of an image defined according to the number of images to be layouted, the horizontal to vertical ratio of an image, the horizontal to vertical ratio of double pages, and the like.

Here, in the example shown in the drawings, as a desirable example, the photo book of the image processing apparatus 10 is modelled on a book (a photo book of double pages). Since the photo book is modelled on a book, the entertainment value or the product quality may be improved.

Accordingly, the template is configured to be modelled on double pages of a book. That is, in the photo book of the example shown in the drawings, the template corresponds to the entire area of two pages when the book is opened. Further, in the invention, the frame of the template may be formed so as to be included in one page or may be formed across both pages of double pages.

Furthermore, in the invention, the template is not limited to the configuration in which the template is modelled on double pages, but may be a template corresponding to the individual page (for each page). Further, the photo book may be a photo book which displays only one page instead of double pages.

Further, in a case where the photo book is modelled on a book and an image may be also disposed on the first page and/or the last page, the template storing unit 16 also stores the template for one page.

Even in these cases, the editing of the image on each page of the photo book may be basically performed in the same way as the method described below.

The LUT 18 is a look-up table which is used for the template selecting unit 20 to select a template.

The template selecting unit 20 is configured to select a template used after editing using the LUT 18 from the template used in double pages to be edited, that is, information on the template used before editing and information on the editing performed by the operation unit 12.

The LUT 18 and the template selecting unit 20 will be described in detail later.

The image editing unit 24 is a part which performs editing of an image in double pages according to the editing operation using the operation unit 12, such as layouting of an image with a template selected by the template selecting unit 20, deleting of an image, enlarging and reducing of an image, and rotating of an image. After performing the editing of an image in double pages, the image editing unit 24 generates the image to be displayed on the display 14. Further, the image editing unit 24 supplies information on the editing using the operation unit 12 (editing information of an image) to the template selecting unit 20. Alternatively, the template selecting unit 20 may acquire the editing information from the image editing unit 24.

Furthermore, in a case where an image is added by editing, the image is acquired from the storage unit or the image acquiring unit (not shown) described above.

Such a process may be performed by a known image processing method.

Hereinafter, the LUT 18, the template selecting unit 20, and the image processing apparatus 10 of the invention will be described in detail through the description of the editing of the photo book in the image processing apparatus 10.

By the operation using the operation unit 12, the photo book is displayed on the display 14, the editing is instructed, and the edited double pages are selected.

Figure 2A:
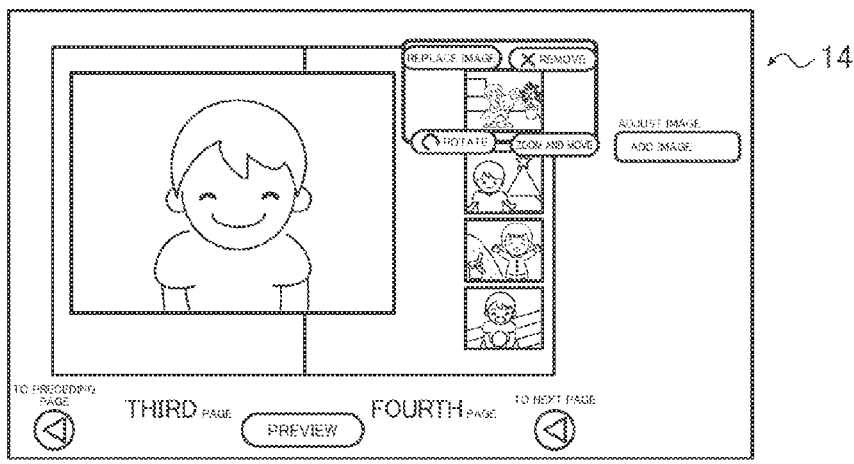
FIGS. 2A to 2C are diagrams conceptually illustrating the operation of the image processing apparatus shown in FIG. 1.
Figure 3A:
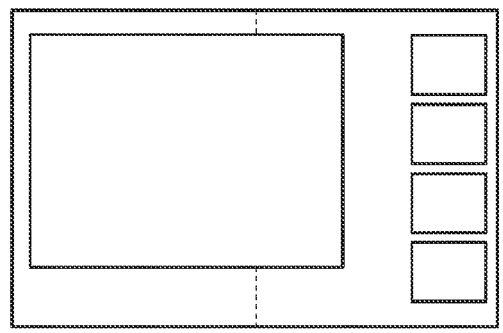
FIGS. 3A and 3B are diagrams conceptually illustrating an example of a template which is used in the image processing apparatus shown in FIG. 1.

As an example, it is assumed that double pages shown in FIG. 2A are selected as the edited pages (third and fourth pages in the example shown in the drawings). In the double pages, a large and horizontally long image is disposed at the left side so as to cross both pages, and four small and horizontally long images are disposed vertically at the right side. Thus, in the double pages, as shown in FIG. 3A, a template is used which includes a frame for disposing a large and horizontally long image at the left side so as to cross both pages and frames for disposing four small and horizontally long images at the right side vertically so that five horizontally long images may be arranged.

For example, the right uppermost image is selected. Accordingly, as shown in FIG. 2A, the display 14 displays four editing buttons of "image replacing", "removing", "rotating", and "zooming and moving".

Further, a button of "image adding" which adds an image into the double pages is displayed at the right side of the screen from the time before the image is selected.

Figure 2B:
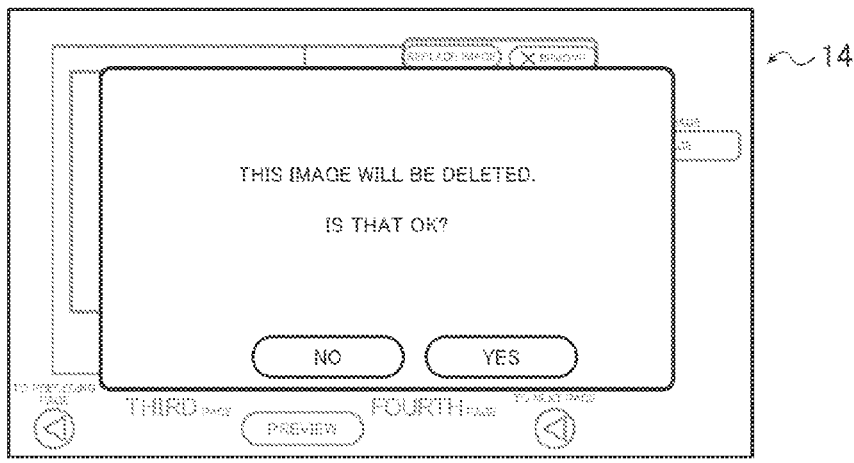

For example, "removing", that is, deleting of the selected image is instructed by the operation unit 12. Accordingly, the display 14 displays a screen which confirms the deleting of the image as shown in FIG. 2B.

In this state, when "Yes" is selected by the operation unit 12, the image editing unit 24 deletes the selected image in the double pages to be edited.

Further, the template selecting unit 20 searches for a template used next in the double pages to be edited from the template storing unit 16, reads out the template, and supplies the template to the image editing unit 24. The template selecting unit 20 performs the searching of the template by using the LUT 18.

Figure 2C:
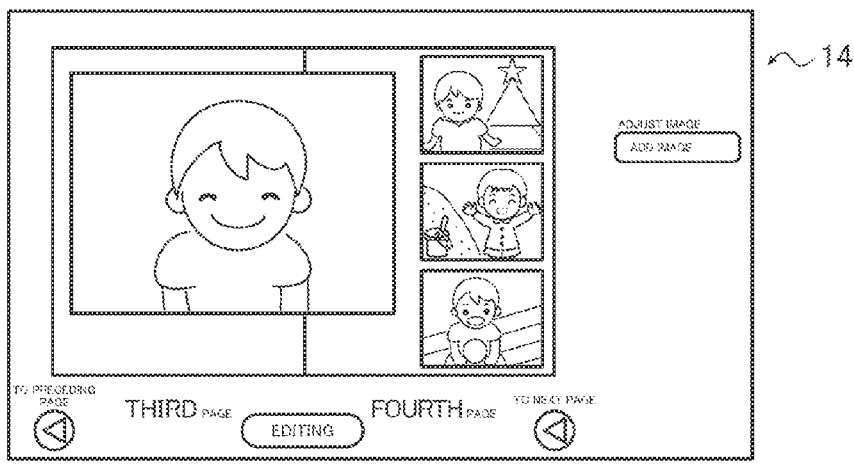

In the example shown in FIGS. 2A, 2B, and 2C, the template used in the edited double pages (hereinafter, referred to as a "template before editing") is a template shown in FIG. 3A as described above, and in the editing, one image is deleted from five horizontally long images. Thus, the template used in the double pages after editing (hereinafter, referred to as a "template after editing") becomes a template having frames for four horizontally long images.

Figure 3B:
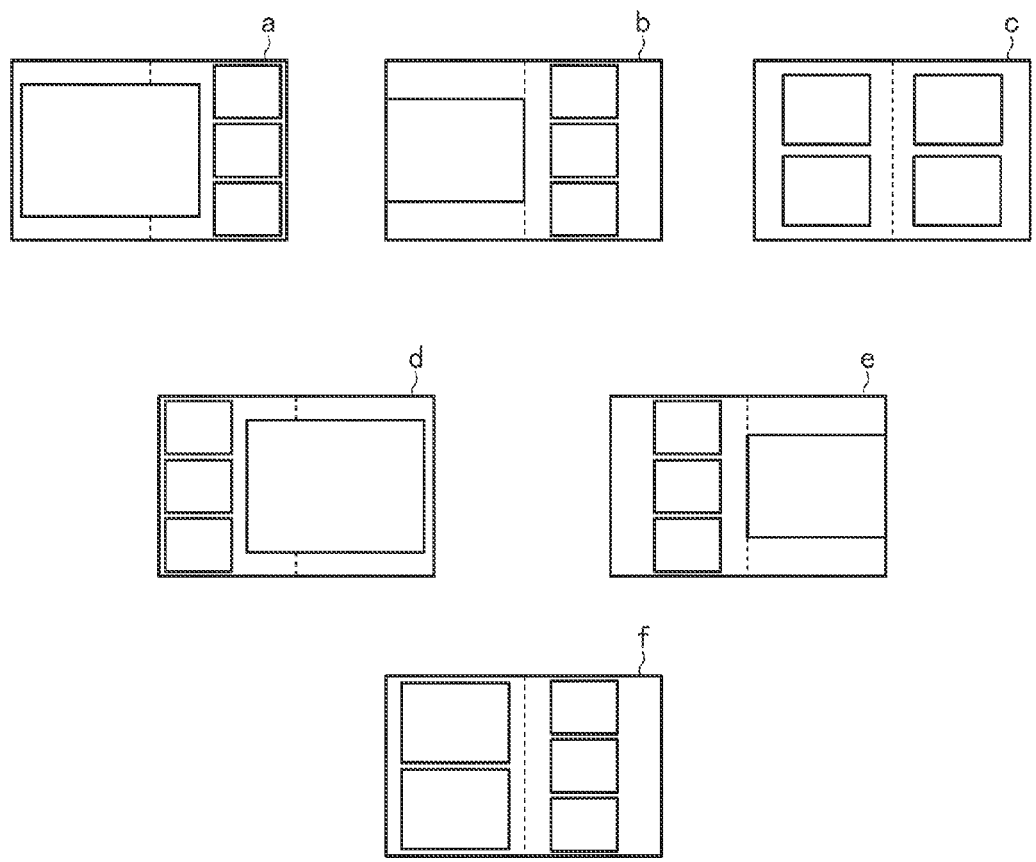

As an example, the template storing unit 16 stores five templates, a template a to a template e shown in FIG. 3B as a template where four horizontally long images may be arranged.

Furthermore, in FIGS. 3A and 3B (or other drawings), the vertical dashed line depicted in each template is a position between pages of the double pages.

Further, in FIG. 3B, only the template having four frames for the horizontally long images is shown. However, the template is not limited to the template of four images, and as described above, the template storing unit 16 stores a great number of types of templates in which the arrangement of a frame, the size of a frame, or the like are different so as to correspond to the combination of various horizontally long images and various vertically long images.

The template selecting unit 20 selects the template after editing from five templates, the template a to the template e shown in FIG. 3B.

As described above, the template before editing is a template which includes a frame for disposing a large and horizontally long image at the left side so as to cross both pages and frames for disposing four small and horizontally long images at the right side vertically so that five horizontally long images may be arranged.

For this reason, the layout of double pages before and after editing may greatly changed when using the template b in which a frame for the large and horizontally long image is provided but is disposed only on the left page, the template c in which the frames for the four horizontally long images of the same size are evenly arranged on both pages, and the template d and the template e in which the positions of the frame for the large and horizontally long image and the frames for the small and horizontally long images are reversed horizontally. For this reason, a user who sees the double pages after editing may have a sense of discomfort.

Thus, in this case, it is desirable that the template a which includes a frame for disposing the large and horizontally long image at the left side so as to cross both pages and frames for disposing the three small and horizontally long images at the right side thereof vertically and which has a configuration (layout) that is the most similar to the template before editing shown in FIG. 3A be used as the template after editing. That is, it is desirable that the template similar to the template before editing be selected as the template after editing.

Furthermore, the same applies to the reverse case. That is, it is assumed that double pages using any one of the templates b to e are edited and one horizontally long image is added. At this time, when the template is used which includes a frame for disposing a large and horizontally long image at the left side so as to cross both pages and frames for disposing four small and horizontally long images at the right side thereof vertically as shown in FIG. 3A as the template after editing, there is a high possibility that the user who sees the double pages after editing may have a sense of discomfort.

For example, double pages using the template c in which frames for evenly disposing four horizontally long images of the same size in both pages is edited, and one horizontally long image is added. In this case, when a template which includes a frame for disposing one horizontally long image so as to cross both pages or a frame for disposing one horizontally long image which is extremely large in size compared to other images is used as the template after editing, there is a high possibility that the user who sees the double pages after editing may have a sense of discomfort.

Thus, in a case where one horizontally long image is added to double pages using the template c, in the double pages after editing, it is desirable to use a template such as the template f shown in FIG. 3B, that is, a template in which frames for the horizontally long images are evenly arranged at the left and right pages according to the number of images and the frames of each page have the same size, and which has a configuration similar to that of the template c.

After the double pages to be edited is selected by the operation unit 12, the editing (adding of an image or deleting of a selected image) is performed, and confirmation is made on the screen shown in FIG. 2B as described above, the template selecting unit 20 selects the template after editing using the LUT 18 from the information on the template before editing and the information on the editing supplied from the image editing unit 24 and performed with the operation unit 12.

Furthermore, the information on the editing is specifically information on whether the editing is adding or deleting of an image and information on whether the added or deleted image (image type) is a vertically long image (vertical) or the horizontally long image (horizontal).

As conceptually shown in FIG. 4, the LUT 18 is an LUT which represents a relationship between the template before editing, the information on the editing, and the template name after editing.

That is, the LUT 18 is an LUT which selects the template after editing by using the template before editing and the information on the editing as parameters. The LUT 18 stores the relationship for all templates stored in the template storing unit 16.

Furthermore, in the example shown in the drawings, the LUT 18 corresponds to adding and deleting of one image. However, the invention is not limited thereto, and the LUT 18 may select the template after editing corresponding to the adding and deleting of a plurality of images.

Here, the LUT 18 has a configuration in which a template having a configuration similar to that of the template before editing is selected as the template after editing according to the template before editing and the information on the editing.

For example, the LUT 18 is configured such that the template a is selected as the template after editing when the template before editing is the template shown FIG. 3A described above and the deleting of the image is performed. In contrast, the LUT 18 is configured such that when the template before editing is the template a and the adding of the horizontally long image is performed, the template shown in FIG. 3A is selected as the template after editing.

Further, the LUT 18 is configured such that the template c is selected as the template after editing when the template before editing is the template f and the deleting of the image is performed. In contrast, the LUT 18 is configured such that when the template before editing is the template c and the adding of the horizontally long image is performed, the template f is selected as the template after editing.

That is, basically, the LUT 18 is configured to select the template which is in the same category as that of the template before editing as the template after editing according to the category of the template to be described later.

After the template selecting unit 20 selects the template after editing using the LUT 18 from the information on the template before editing and the information on the editing performed by the operation unit 12 as described above, the selected template is read out from the template storing unit 16, and is supplied to the image editing unit 24.

The image editing unit 24 performs enlarging, reducing and the like of the images if necessary so that the images which are not deleted are layouted (arranged) with the supplied template to generate (synthesize) the image to be displayed, and the generated image is displayed on the display 14 as double pages after editing.

As described above, according to the invention, the selecting of the template for the editing or the layouting of the image with the selected template is automatically performed by the image processing apparatus 10 and the selecting of the image to be deleted or the adding of the selected image is performed by the user (operator) in the editing of the double pages of the photo book. For this reason, the user may perform the editing of the double pages of the photo book with the minimum number of operations.

Further, in the invention, the template after editing is selected from the information on the template before editing (the arrangement information) and the editing information instead of the number of images after editing and the type of the image which is vertical or horizontal. For this reason, according to the invention, double pages after editing may be created by selecting a template having a configuration similar to that of the template before editing as the template after editing. Thus, since the configurations of the double pages before and after editing are similar to each other, the user who sees the double pages after editing does not feel a sense of discomfort or the sense of discomfort of the user after editing may be remarkably suppressed.

In the present invention, various timings are usable for changing the displayed contents (such as layouted images) on the display 14 according to the edition.

For instance, the displayed contents on the display 14 may be changed after a series of editing operations through the operation unit 12, such as addition or deletion of an image, have been completed. Or alternatively, the displayed contents on the display 14 may be changed in the process of an editing operation through the operation unit 12, such as dragging with a pointer, in synchronization with the performed operation (dragging, for instance).

In other words, the displayed contents on the display 14 may be changed after a series of editing operations or in real time for each operation. It is also possible to make the display change after a series of editing operations and the display change in real time selectable as a display change mode.

Figure 5A:
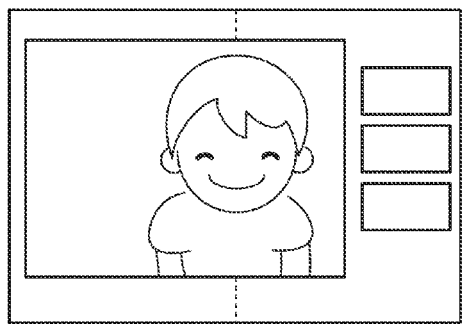
FIGS. 5A and 5B are diagrams conceptually illustrating another example of the operation of the image processing apparatus shown in FIG. 1.

Incidentally, as shown in the drawings, the illustrated photo book is modelled on a book. For this reason, in a case where the template having a frame crossing both pages is used, as shown in FIG. 5A, the face in the image may be disposed over the pages (double-page portion) depending on the template after editing.

Figure 5B:
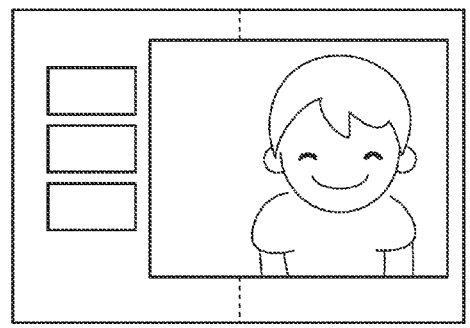

In such a case, as shown in FIG. 5B, a template in which the face does not cross the pages and which has a configuration similar to that of the selected template (or the template before editing) may be re-selected. As an example, one or more templates similar to the template after editing may be marked in the LUT 18 and the template in which the face does not cross the pages may be automatically selected from the similar templates when it is recognized that the face crosses the pages by image analysis.

In the above-described example, the adding or deleting of the image is performed in double pages (or individual page) as the editing, but the invention is not limited thereto. For example, in the invention, the rotating of the image displayed on the double pages may be performed as the editing.

Figure 6A:
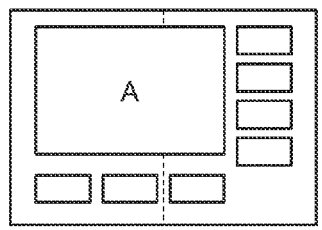
FIGS. 6A to 6C are diagrams conceptually illustrating still another example of the operation of the image processing apparatus shown in FIG. 1.
Figure 6B:
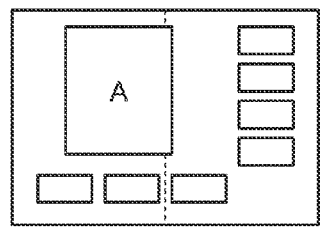

For example, the image A as the maximum image is rotated in double pages using the template shown in FIG. 6A. At this time, when the template in which the frame for the vertically long image is disposed at the position of the image A is simply selected as the template after editing, as shown in FIG. 6B, the balance of the image layout is lost in the double pages after editing. As a result, there is a high possibility that the user feels a strong sense of discomfort in the double pages after editing.

In response to this, in a case where the operation unit 12 has a function of rotating an image as the editing of double pages, the LUT 18 is configured to select a template which has a frame assembling the image after rotating thereto and has a configuration similar to that of the template before editing by using the information on the template before editing, the information on the rotating and the information on the image to be rotated as the editing information.

Figure 6C:
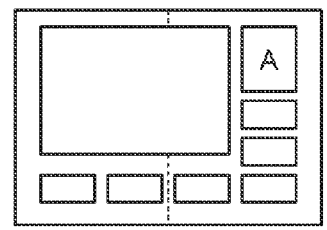

For example, in the example shown in FIGS. 6A to 6C, the LUT 18 may be configured to select a template shown in FIG. 6C which has a frame for the vertically long image and is similar to the template before editing as the template after editing. Alternatively, the LUT 18 may be configured to select a template which is similar to the template before editing by using the rotating of the image as the editing information in addition to the adding and deleting of the image.

In the above-described example, the template selecting unit 20 automatically selects the template after editing using the LUT 18 in accordance with the information on the template before editing and the editing information, but the invention is not limited thereto.

That is, in the invention, the template selecting unit 20 may be configured to automatically select the template after editing by using the information on the template before editing and the editing information without using the LUT 18.

As an example, a method may be used in which the templates are classified into a plurality of categories and the template selecting unit 20 automatically selects the template after editing by using the information on the category of the template as the information on the template before editing in addition to the information on the template before editing itself.

Examples of the template category include a basic template, a page crossing template, an emphasized template, and a panorama template.

The basic template is a template which does not include an extremely large or small frame and evenly divides the frames in the double pages in accordance with the total number of frames and the number of frames for the vertically long images and the horizontally long images and in which the frames disposed in the same page have the same size. That is, it is a template like the template c or the template f of FIG. 3B.

The page crossing template is a template which has a frame crossing the double pages (double-page portion). That is, it is a template like the template shown in FIG. 3A or the template a or the template d shown in FIG. 3B.

The emphasized template is a template which does not include a frame crossing the double pages but includes a frame extremely larger than the others so as to emphasize the specific image. For example, it is a template in which the difference in the number of frames between the right page and the left page is two or more and a template which includes frames having different sizes in one page. That is, it is a template like the template b or the template e shown in FIG. 3B.

The panorama template is a template which includes a frame for a panoramic picture.

In this example, the template selecting unit 20 selects the template after editing according to a predetermined rule in accordance with the template and the information on the category of the template as the information on the template and the information on adding or deleting of the image as the editing information.

Specifically, only when the image of a specific frame is deleted in the page crossing template, the emphasized template, and the panorama template, the basic template is selected in accordance with the template before editing and the number of images deleted in the editing or the vertical/horizontal length thereof. In other cases, in all cases, a template of the same category is selected in accordance with the template before editing and the number of added or deleted images or the vertical/horizontal length thereof.

Furthermore, the image of the characteristic frame is an image disposed in a frame crossing the pages (a page crossing image) in the page crossing template, is an image disposed in the largest frame (an emphasized image) in the emphasized template, and is a panoramic image in the panorama template.

That is, the template selecting unit 20 selects the template after editing according to the rule shown in the following table in accordance with the information on the template before editing and the type and the number of added or deleted images.

TABLE 1

| Category of template before changing | Editing contents | | Category of template to be selected |
|---|---|---|---|
| crossing of page | adding of image | | crossing of page |
|  | deleting of image | page crossing image | basic |
|  |  | the others | crossing of page |
| emphasizing | adding of image | | emphasizing |
|  | deleting of image | emphasized image | basic |
|  |  | the others | emphasizing |
| basic | adding of image | | basic |
|  | deleting of image | | basic |

TABLE 1-continued

| Category of template before changing | Editing contents | | Category of template to be selected |
|---|---|---|---|
| panorama | adding of image | | panorama |
|  | deleting of image | panoramic image | basic |
|  |  | the others | panorama |

When the categories of the template used before and after editing are the same, the basic layout of double pages before and after editing is the same. For this reason, when a template of the same category as that of the template before editing is selected as the template after editing, the sense of discomfort of the user who sees the double pages after editing may be eliminated or reduced.

Further, in a case where the page crossing image, the emphasized image, the panoramic image, and the like are deleted by the editing, even when the layouts before and after editing are similar to each other, there is also a high possibility that the impression of the double pages may be changed. For this reason, when the characteristic image is deleted like the page crossing image or the emphasized image, the sense of discomfort of the user after editing may be reduced by using the most common, that is, natural basic template as the template after editing.

Here, in a case where the image is added by editing, the added image may be an image which is important to the user, such as a close-up face image, an image showing a person in an enlarged size, and an image showing many persons.

In a case where the page crossing template or the emphasized template is used, when the important image is added, the added image may be disposed in the characteristic frame. However, in the basic template, basically, all frames have the same size. For this reason, even when the important image is added, the image may not be displayed as the main image of double pages after editing.

For this reason, in a case where the template used in the edited double pages is the basic template and an image is added by editing, scoring according to the level of importance may be performed on the added image, and the template after editing may be selected as in the following table in accordance with the score of the added image. Accordingly, when the important image is added, the image may be displayed as the main image in double pages after editing.

TABLE 2

| Category of template before changing | Editing contents | | Category of template to be selected |
|---|---|---|---|
| basic | adding of image | high-score image | crossing of page |
|  |  | middle-score image | emphasizing |
|  |  | low-score image | basic |
|  | deleting of image | | basic |

Furthermore, in this example, the scoring of the image may be performed by a known method which is performed in various image processing apparatuses or photo books. The template selecting unit 20 or the image editing unit 24, for instance, is available for the scoring of the image.

As an example, by using the ratio of the area of the face of a person within the image, the ratio of the area of the person within the image, and the number of shown persons which is one or more, the score according to the each ratio or the number of persons is set, and the image analysis is performed so as to calculate and sum up the score, thereby determining whether the image is a high-score image, a middle-score image, or a low-score image.

Furthermore, in the invention, the selecting of the template after editing using the template selecting unit 20 is not limited to the method using the LUT 18 or the method using the category of the template, and various methods may be used.

For example, the template selecting unit 20 may compare the template before editing with the templates stored in the template storing unit 16, and may automatically select the template in which the difference becomes the smallest after the editing according to the information on the editing such as adding of the image and deleting of the image. Alternatively, a template in which the difference is smaller than an appropriately set threshold value may be automatically selected instead of the template in which the difference becomes the smallest after the editing.

Specifically, the template selecting unit 20 first extracts templates which are usable for the template after editing from the template storing unit 16 in accordance with the template before editing and the editing information.

Next, the template before editing is compared with each of the extracted templates in one or more of the total area of the frame, the size of each frame, the shape of each frame, the position (coordinate points) of each frame, the position of the center of gravity (the position of the largest frame (the center thereof)), a difference in area between the largest frame and the smallest frame, and the like.

Then, a template of which the difference with respect to the template before editing is the smallest is selected as the template after editing. Alternatively, a template of which the difference with respect to the template before editing is smaller than a threshold value is selected as the template after editing.

Furthermore, in a case where the template having a difference smaller than the threshold value is selected, as an example, a calculation is performed on the extracted templates in an arbitrary order or a predetermined order, and a template having a difference smaller than the threshold value at the first time may be selected as the template after editing.

Incidentally, in the above-described example, the selecting of the template after editing is performed by using the information on the template before editing and the editing information.

Here, in the page crossing template or the emphasized template, a large frame or a small frame is included as described above. For this reason, the important image as described above may be disposed in the small frame.

Figure 7A:
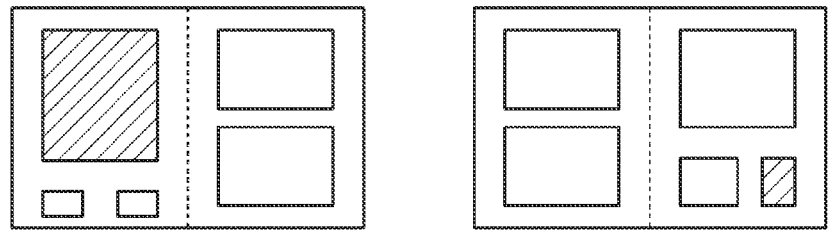
FIGS. 7A to 7C are diagrams conceptually illustrating yet another example of the operation of the image processing apparatus shown in FIG. 1.

For example, in a case where a template having one frame for the vertically long image and four frames for the horizontally long images is used, if the template shown at the left side of FIG. 7A is selected when the vertically long image is the most important, the important image may be disposed in a large frame (shaded frame). However, in a case where the template shown at the right side of FIG. 7A is selected, the important vertically long image is disposed in a small frame (shaded frame).

In order to avoid this, in the invention, in a case where an image is added to double pages by editing, in the same way as described above, the added image may be scored, and the template after editing may be selected so that the high-score image is disposed in a large frame in accordance with the score (that is, the level of importance of the image).

Figure 7B:
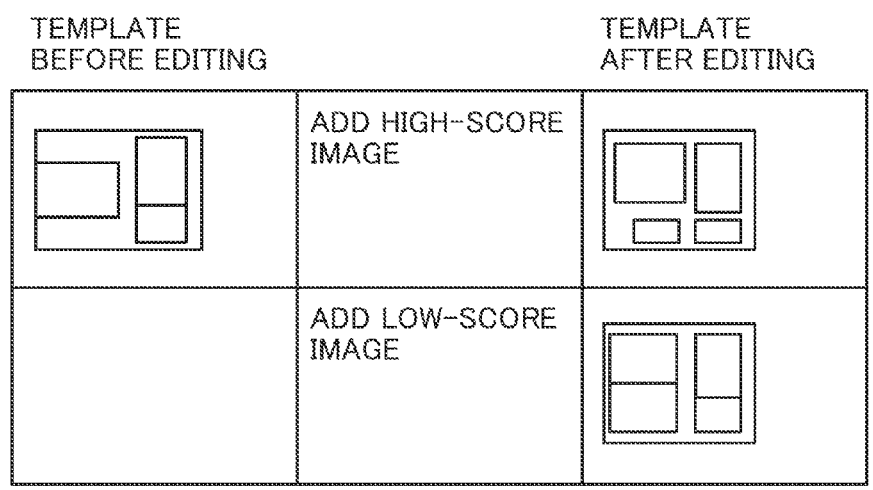

For example, it is assumed that a horizontally long image is added by editing to double pages using the template shown in the left side of FIG. 7B which includes a frame for the left horizontally long image, a frame for the right vertically long image, and an underlying frame for the horizontally long image.

At this time, in a case where the added image is a high-score image of which the score is equal to or larger than a predetermined threshold value, as shown in the right upper section of FIG. 7B, a template which has a configuration similar to that of the template before editing and has a large frame for the horizontally long image is selected as the template after editing, and the added image is disposed in the large frame. In contrast, in a case where the added image is a low-score image of which the score is smaller than a predetermined threshold value, in the same way as the above-described example, a template which has a frame for the horizontally long image equivalent to the other frame and has a configuration similar to the template before editing is selected as the template after editing.

Alternatively, in a case where an image is added, the template after editing may be selected in accordance with the scores of the images originally arranged in the double pages to be edited.

Figure 7C:
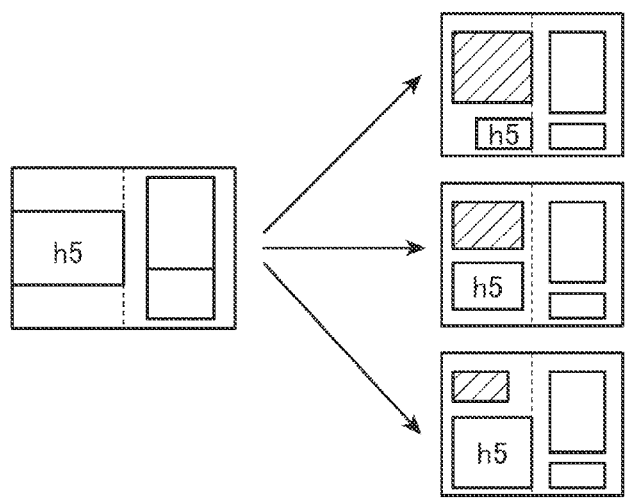
Figure 8A:
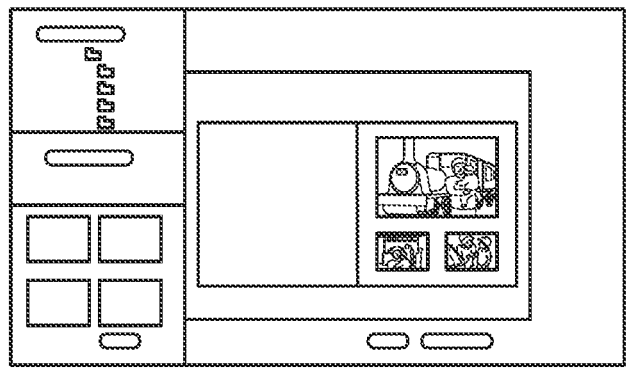
FIGS. 8A to 8D are diagrams conceptually illustrating the deleting of an image in the conventional photo book.
Figure 8B:
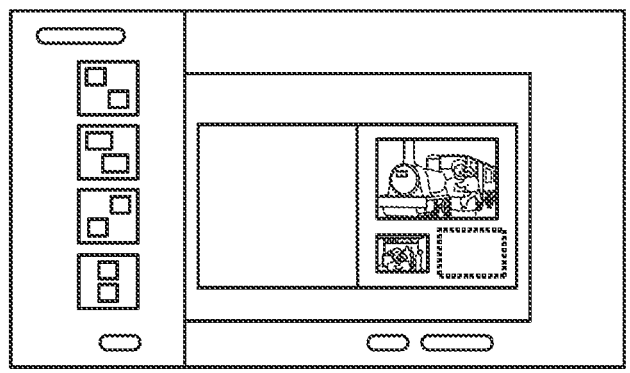
Figure 8C:
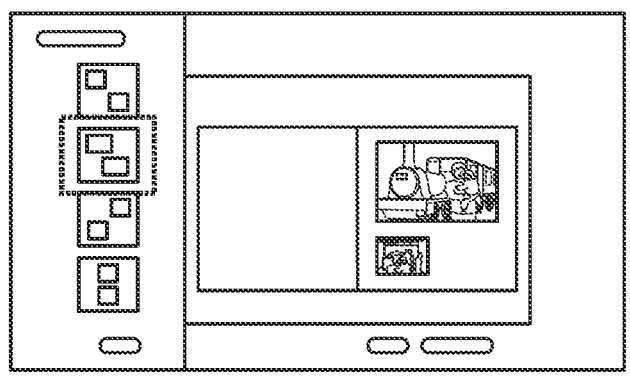
Figure 8D:
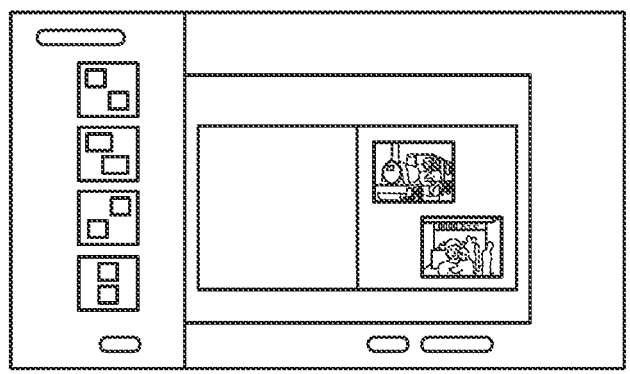

As an example, similarly to the above-described example, it is assumed that a horizontally long image is added by editing to double pages using the template shown at the left side of FIG. 7C which includes a frame for the left horizontally long image, a frame for the right vertically long image, and an underlying frame for the horizontally long image as the template before editing.

At this time, in a case where the score of the added image is higher (more important) than that of the image h5 based on the score of the image h5, as shown in the right upper section of FIG. 7C, a template which has a configuration similar to that of the template before editing and includes a large frame for the horizontally long image and an underlying small frame is selected, the added image (shaded image) is disposed in the large frame, and the image h5 is disposed in the small frame.

In a case where the score of the added horizontally long image is equal to that of the image h5, as shown in the right middle section of FIG. 7C, a template which has a configuration similar to that of the template before editing and includes frames for two horizontally long images having the same size and disposed at the upper and lower positions is selected, and the added image (shaded image) and the image h5 are disposed in the frames.

Furthermore, in a case where the score of the added horizontally long image is lower than that of the image h5, as shown in the right lower section of FIG. 7C, a template which has a configuration similar to that of the template before editing and includes a small frame for the horizontally long image and an underlying large frame is selected, the added image (shaded image) is disposed in the small frame, and the image h5 is disposed in the large frame.

Also in the case where an image is deleted from double pages, selection of a template and layout of an image may be performed in accordance with the scores of the remaining images.

If an image is deleted by editing and an image with a higher score remains, the template which has a configuration similar to that of the template before editing and includes a larger frame may be selected, and the image with a higher score may be disposed in the larger frame. If an image is deleted by editing and the remaining images have close scores, the template which has a configuration similar to that of the template before editing and is constituted of frames of the same size may be selected, and the remaining images may be disposed in the frames, respectively.

If an image collection with successive pages (ordered screens to be displayed), such as a photo book, should be edited by the image processing apparatus 10, selection of a template may be carried out using information on templates for pages (sequentially ordered screens to be displayed).

To be more specific: In the example as shown, the entertainment of the photo book may be impaired if double pages, namely, double-page spreads using the same template are successively displayed. Consequently, template selection may be performed during the edition of the photo book such that the templates as used in the double-page spreads preceding and following the double-page spread to be subjected to image edition are checked so as not to use the same template in successive double-page spreads.

While the image processing apparatus, the image processing method, and the image processing program of the invention have been described in detail, the invention is not limited to the above-described embodiments, and various improvements and modifications may be, of course, made without departing from the spirit of the invention.

What is claimed is:

1. An image processing apparatus which edits an image layouted in accordance with arrangement information, the image processing apparatus comprising:
   a storage unit that stores a plurality of templates, the templates each including arrangement information of an image laid out in a frame on a page, the arrangement information including whether the frame has a frame orientation selected from the group consisting of a vertically long frame and a horizontally long frame, a size of the frame, and a position of within the page, the templates being different from each other;
   a display for displaying the image laid out on the page in accordance with the arrangement information of a current template;
   an editing unit for performing editing, using an editing function, on the page on which the image is displayed on the display, wherein prior to performing the editing function, the image is laid out on a before-editing page in accordance with a first template having a first frame with a first frame orientation, a first size, and a first position, the image being laid out within the first frame;
   an arrangement information selecting unit configured to automatically select, using editing information from the editing function, a second template to display the page on the display as an after-editing page, the second template being most similar to the first template, from all the templates in the storage unit, based on the editing information, the editing information being all of the group consisting of i) information of a change in the frame orientation of the first frame, ii) information of change in the size of the image with the first frame, iii) information of a change in the position of the first frame, and iv) information of a change in a number of frames within the page; and
   an image layouting unit for layouting the page as the after-editing page by using the second template selected by the arrangement information selecting unit in accordance with the editing in the editing unit.

2. The image processing apparatus according to claim 1, wherein the editing function is one or both of an image adding function and an image deleting function as an image editing function, and
   wherein the arrangement information selecting unit uses image adding or deleting information as the editing information to determine the change in the number of frames within the page.

3. The image processing apparatus according to claim 2, wherein the arrangement information selecting unit further uses information on whether an added or deleted image is a vertically long image or a horizontally long image as the editing information.

4. The image processing apparatus according to claim 1, wherein the editing unit has an image rotating function as the editing function, and
   wherein the arrangement information selecting unit uses image rotating information as the editing information to determine the change in the frame orientation of the first frame.

5. The image processing apparatus according to claim 1, wherein the first and second templates each correspond to double pages of a book.

6. The image processing apparatus according to claim 1, wherein the arrangement information selecting unit selects the arrangement information used for selecting the second template from the storage unit by using a look-up table having parameters such as the arrangement information of the image displayed on the display and the editing information on the editing in the editing unit.

7. The image processing apparatus according to claim 1, wherein the templates stored in the storage unit are classified into a plurality of categories.

8. The image processing apparatus according to claim 7, wherein the arrangement information selecting unit further uses information on a category of the respective templates as information for selecting the second template.

9. The image processing apparatus according to claim 1, wherein the arrangement information selecting unit further uses, as the editing information for selecting the second template, information on screens displayed by the display as sequentially ordered screens.

10. The image processing apparatus according to claim 1, wherein scoring is performed on the image, and
    wherein the arrangement information selecting unit further uses information on a score of the image as the editing information for selecting the second template from the plurality of templates.

11. The image processing apparatus according to claim 1, wherein images of a photo book are edited.

12. An image processing method for editing an image layouted in accordance with arrangement information, the image processing method comprising:
    a displaying step for displaying an image layouted on a display in a frame on a page, wherein the frame has i) a frame orientation selected from the group consisting of a vertically long frame and a horizontally long frame, ii) a size, and iii) a position of within the page, in accordance with a first template, the first template having been acquired from templates stored in a storage unit;
    an editing information acquiring step for acquiring editing information as information of editing from an instruction for editing the image displayed on the display;
    a selecting step of automatically selecting a second template from a plurality of stored templates, the selected second template being selected using the acquired editing information such that the second template is most similar to the first template from all the templates stored in the storage unit, based on the editing information, the editing information being all of the group consisting of i) information of a change in the frame orientation of the frame ii) information of change in the size of the image within the frame, iii) information of a change in the position of the frame, and iv) information of a change in a number of frames within the page; and a re-displaying step for editing the image in accordance with the editing instruction, layouting the image using the second template selected in the selecting step, and displaying the layouted image on the display.

13. The image processing method according to claim 12, wherein the editing of the image is adding or deleting of the image, and in the selecting step, image adding information or image deleting information is used as the editing information to determine the change in the number of frames within the page.

14. The image processing method according to claim 13, wherein in the selecting step, information on whether an added or deleted image is a vertically long image or a horizontally long image is further used as the editing information.

15. The image processing method according to claim 12, wherein the editing of the image is rotating of the image, and in the selecting step, image rotating information is used as the editing information to determine the change in the frame orientation of the frame.

16. A computer readable recording medium having recorded thereon a program for causing a computer to execute respective steps of the image processing method according to claim 12 as procedures.

17. The image processing apparatus according to claim 1, wherein each template models double pages of a book, each template corresponding to an entirety of two pages when the book is open.

18. The image processing apparatus according to claim 17, wherein,
the first template has the first frame in the first position such that the image and the first frame, before performing the editing function, are laid out spanning the two pages, and
the arrangement information selecting unit, selects the second template based, at least in part, on the first frame spanning the two pages.

19. The image processing apparatus according to claim 1, wherein,
the editing function is adding a new image to the page, and
the arrangement information selecting unit is configured so that, after performing the addition of the new image on the page, to select the second template that further includes a second frame having a location within the page and with respect to the first frame based on a score indicating an importance of the new image with respect to the image laid out in the first frame.

\* \* \* \* \*